United States Patent
Barkelew et al.

(10) Patent No.: US 9,690,943 B2
(45) Date of Patent: Jun. 27, 2017

(54) BIOS SECURE DATA MANAGEMENT SYSTEM

(71) Applicant: Dell Products L.P., Round Rock, TX (US)

(72) Inventors: Jonathan Bret Barkelew, Austin, TX (US); Kurt David Gillespie, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 14/295,947

(22) Filed: Jun. 4, 2014

(65) Prior Publication Data

US 2015/0356299 A1    Dec. 10, 2015

(51) Int. Cl.
    *G06F 1/00*    (2006.01)
    *G06F 21/57*    (2013.01)
    *G06F 9/44*    (2006.01)

(52) U.S. Cl.
    CPC .......... *G06F 21/575* (2013.01); *G06F 9/4401* (2013.01); *G06F 2221/034* (2013.01)

(58) Field of Classification Search
    CPC ................................ G06F 9/44; G06F 21/575
    See application file for complete search history.

(56) References Cited

U.S. PATENT DOCUMENTS

| | | | | |
|---|---|---|---|---|
| 6,691,234 B1* | 2/2004 | Huff | ...................... | G06F 9/4418 711/173 |
| 2006/0259782 A1* | 11/2006 | Wang | ...................... | G06F 21/62 713/189 |
| 2007/0143589 A1* | 6/2007 | Rawe | ...................... | G06F 9/441 713/2 |
| 2008/0104706 A1* | 5/2008 | Karp | ................... | H04L 63/0428 726/26 |
| 2008/0313627 A1* | 12/2008 | Segawa | ................. | G06F 21/572 717/171 |
| 2009/0070598 A1* | 3/2009 | Cromer | ................. | G06F 21/575 713/193 |
| 2011/0061046 A1* | 3/2011 | Phillips | ............... | G06F 9/45533 717/176 |
| 2011/0087896 A1* | 4/2011 | Thom | ...................... | G06F 21/34 713/193 |
| 2011/0126023 A1* | 5/2011 | Wang | ................... | G06F 21/6209 713/182 |

* cited by examiner

*Primary Examiner* — Mohammed Rehman
(74) *Attorney, Agent, or Firm* — Haynes and Boone, LLP

(57) ABSTRACT

A Basic Input/Output System (BIOS) secure data management system includes a BIOS that is configured to perform a boot process. At least one memory system is configured to provide a System Management (SM) memory location that is only accessible by the BIOS. A trusted platform module (TPM) includes at least one register and is configured to store sealed first secure data. The TPM is configured to use at least one first value in the at least one register that depends on the boot process to unseal the sealed first secure data to provide unsealed first secure data, and provide that unsealed first secure data to the BIOS for storage in the SM memory location. The BIOS is configured to retrieve the unsealed first secure data from the SM memory location and use the unsealed first secure data to perform a security function.

20 Claims, 4 Drawing Sheets

BIOS SECURE DATA MANAGEMENT SYSTEM

BACKGROUND

The present disclosure relates generally to information handling systems, and more particularly to a Basic Input/Output System (BIOS) secure data management system for information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs include a Basic Input/Output System (BIOS) that is used to boot the IHS by initializing the IHS, testing the IHS components, loading an operating system on the IHS, and performing a variety of other BIOS functionality known in the art. It is desirable to keep some data provided to and/or utilized by the BIOS persistent across IHS boots. For example, it would be convenient for the BIOS to store passwords, keys, and/or other sensitive and/or private data known in the art such that the user does not have to continually provide such data upon each IHS boot. Conventionally, data that is desired to be kept persistent across IHS boots is stored in a non-volatile random access memory (NVRAM), hard disk drive, solid state drive, and/or other storage system that is accessible throughout the runtime of the IHS. As such, only data that is not intended to be secured against basic malicious attacks (e.g., a hash of a password or other obfuscated security data) may be kept persistent across IHS boots, as conventional BIOS has no mechanism to store data such that it is both persistent across IHS boots and also secure against third parties retrieving the stored data.

Accordingly, it would be desirable to provide a Basic Input/Output System (BIOS) secure data management system.

SUMMARY

According to one embodiment, an information handling system (IHS) includes a Basic Input/Output System (BIOS) that is configured to perform an IHS boot process; an IHS processing system; an IHS memory system that is coupled to the IHS processing system and that is configured to provide a System Management Random Access Memory (SMRAM) that is only accessible by the BIOS; a storage system that includes an encrypted item; a trusted platform module (TPM) that includes at least one register and that is configured to store sealed first secure data, wherein the TPM is configured to use at least one first value in the at least one register that depends on the IHS boot process to unseal the sealed first decryption key to provide an unsealed first decryption key, and provide that unsealed first decryption key to the BIOS for storage in the SMRAM; and the BIOS is configured to retrieve the unsealed first decryption key from the SMRAM and use the unsealed first decryption key to decrypt the encrypted item in the storage system.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
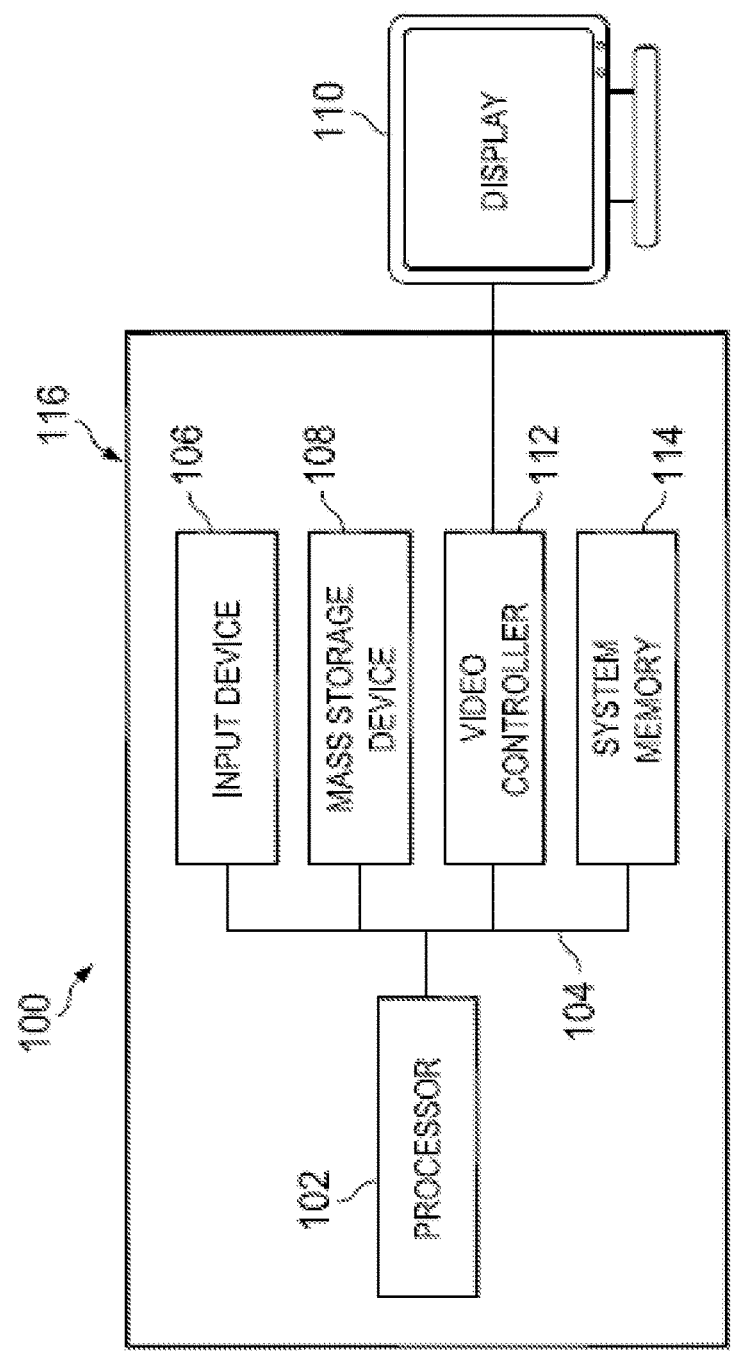
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
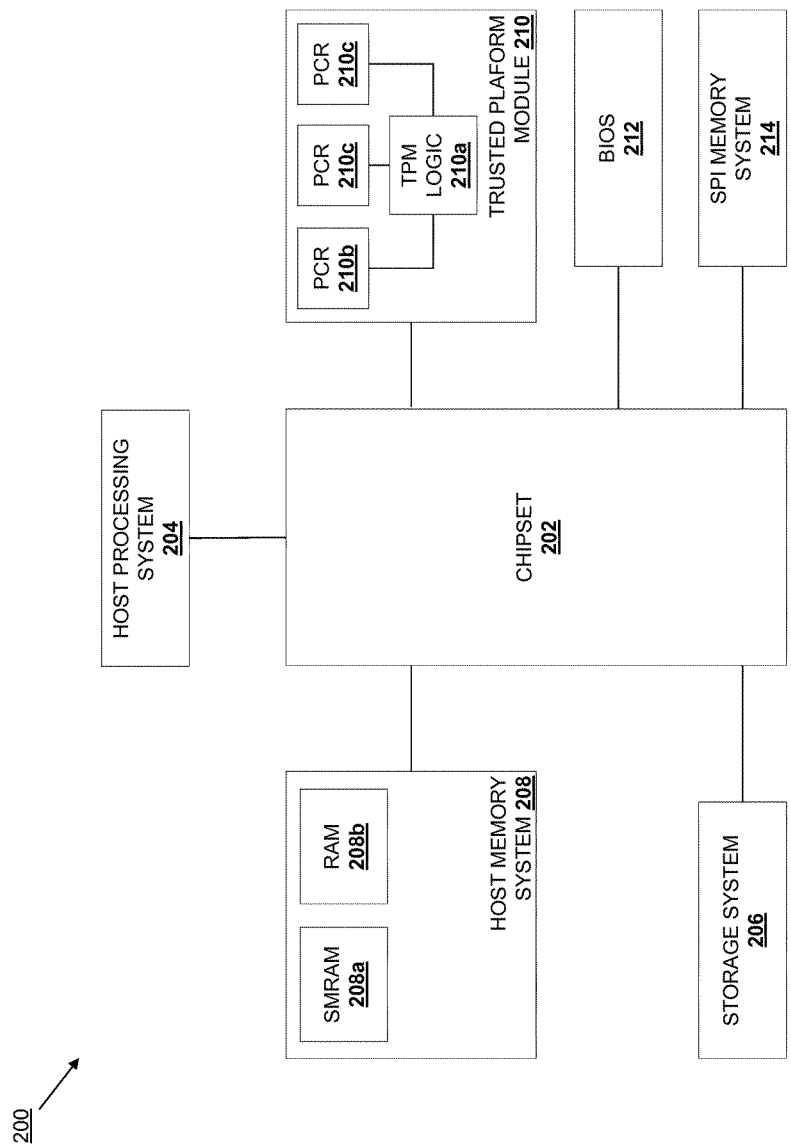
FIG. 2 is a schematic view illustrating an embodiment of a BIOS secure data management system.

Referring now to FIG. 2, an embodiment of a Basic Input/Output System (BIOS) secure data management system 200 is illustrated. In an embodiment, the BIOS secure data management system 200 may be the IHS 100, discussed above with reference to FIG. 1 and/or may include some or all of the components of the IHS 100. The BIOS secure data management system 200 includes a chipset 202 that provides a variety of electronic components of an integrated circuit that operates to manage the data flow between components of the BIOS secure data management system 200, and may be included on, for example, a motherboard in the chassis 116 of the IHS 100. A host processing system 204 is coupled to the chipset 202 through a bus, and may include the processor 102 discussed above with reference to FIG. 1 and/or a variety of other processing system elements known in the art that are configured to perform processing functions for an IHS subsequent to the completion of an IHS boot process, discussed below. A storage system 206 is coupled to the chipset 202 through a bus, and may include the storage device 108 discussed above with reference to FIG. 1 and/or a variety of other storage system components known in the art. For example, the storage system 206 may include one or more hard disk drives, solid state drives, and/or other storage devices known in the art.

A host memory system 208 is coupled to the chipset 202 through a bus, and is configured to provide a plurality of memory locations such as, for example, a System Management (SM) memory location such as the System Management Random Access Memory (SMRAM) 208a in the illustrated embodiment, and a non-SM memory location such as the RAM 208b (also referred to below as the non-SM memory location or non-SMRAM) in the illustrated embodiment. For example, during an IHS boot process, the BIOS may transition the IHS to a System Management Mode (SMM) and allocate a memory location in the host memory system 208 as an SM memory location or SMRAM 208a that is only accessible by the BIOS. In some embodiments, the RAM 208b in the host memory system 208 may be distinguished from the SMRAM 208a based on its accessibility by IHS systems other than the BIOS. While the embodiments discussed below reference an SM memory location/SMRAM that is allocated by the BIOS in SMM, one of skill in the art in possession of the present disclosure will recognize that memory locations accessible only by the BIOS may be allocated in a variety of other secure operating modes known in the art while remaining within the scope of the present disclosure.

A trusted platform module (TPM) 210 is coupled to the chipset 222 through a bus, and includes TPM logic 210 that is coupled to registers such as, for example, the Platform Configuration Registers (PCRs) 210b, 210c, and 210d in the illustrated embodiment. In an embodiment, the TPM 210 may include a secured input/output component; a cryptographic processor having a random number generator, an RSA key generator, a Secure Hash Algorithm (SHA)-1 hash generator, and an encryption-decryption signature engine; a persistent memory having an endorsement key and a storage root key; a versatile memory having the PCRs, attestation identity keys, and storage keys, and/or a variety of other TPM components known in the art. As discussed in further detail below, the TPM 210 is configured to encrypt, and/or protect from physical access, secure data (referred to below as "sealing" secure data) and designate a state in which the TPM 210 must be in (as provided via values in one or more of the PCRs 210b, 210c, and 210d) such that the encrypted secure data may be decrypted (referred to below as "unsealing" secure data).

A BIOS 212 is coupled to the chipset by a bus. In an embodiment, the BIOS may be a standard BIOS, the Unified Extensible Firmware Interface (UEFI), and/or a variety of other systems known in the art that provide for the boot the IHS by initializing the IHS, testing the IHS components, loading an operating system on the IHS, and/or performing a variety of other BIOS functionality known in the art. A boot memory system such as, for example, the Serial Peripheral Interface (SPI) memory system 214 is coupled to the chipset 202 by a bus, and is configured to store boot blocks used by the BIOS 212 for performing the IHS boot process. In an embodiment, an SPI controller is included in and/or provided by the chipset 202 for accessing the SPI memory system 214. While a specific example of the BIOS secure data management system 200 has been illustrated and described, other IHS components may be included in the BIOS secure data management system 200 while remaining within the scope of the present disclosure.

Figure 3:
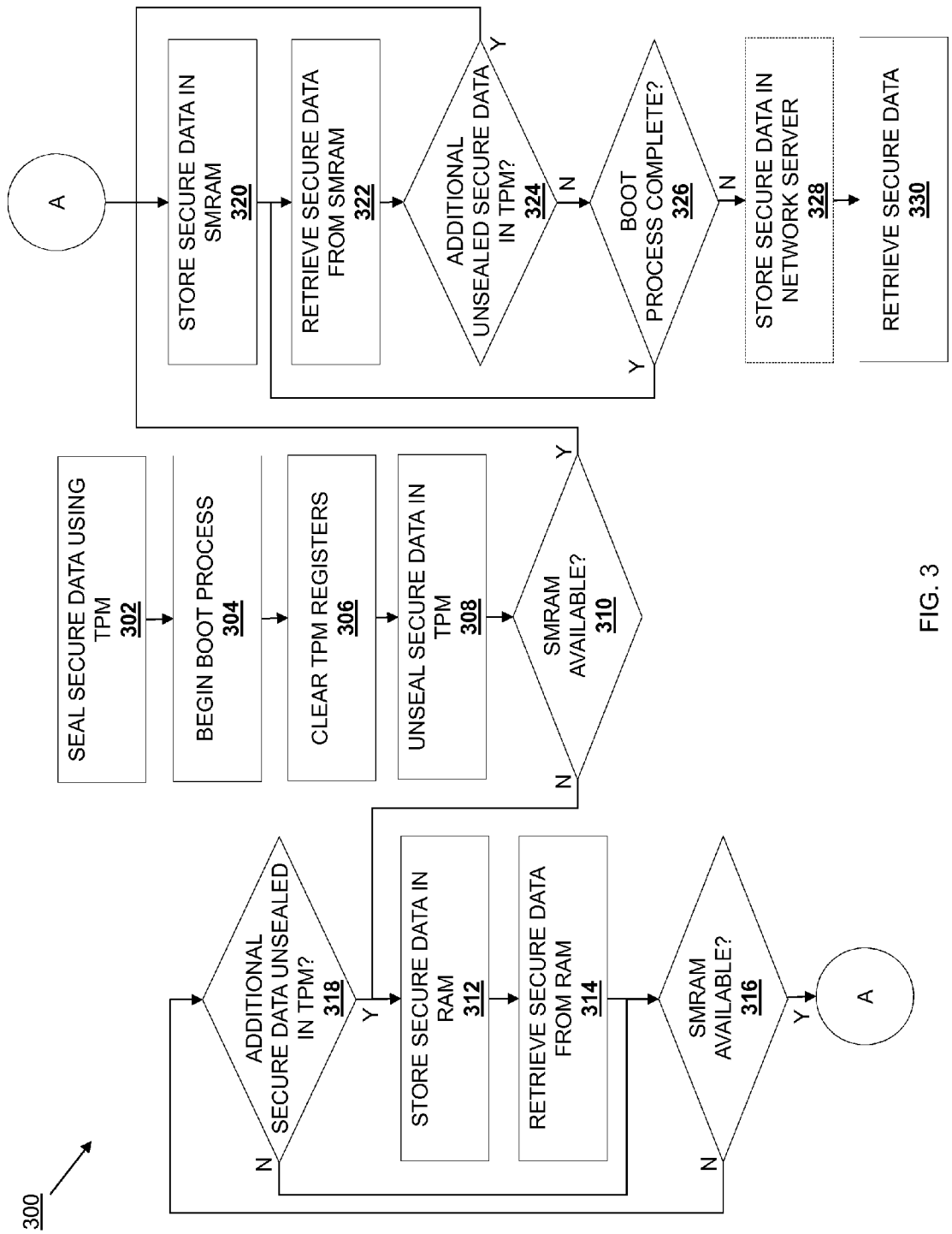
FIG. 3 is a flow chart illustrating an embodiment of a method for BIOS secure data management.
Figure 4:
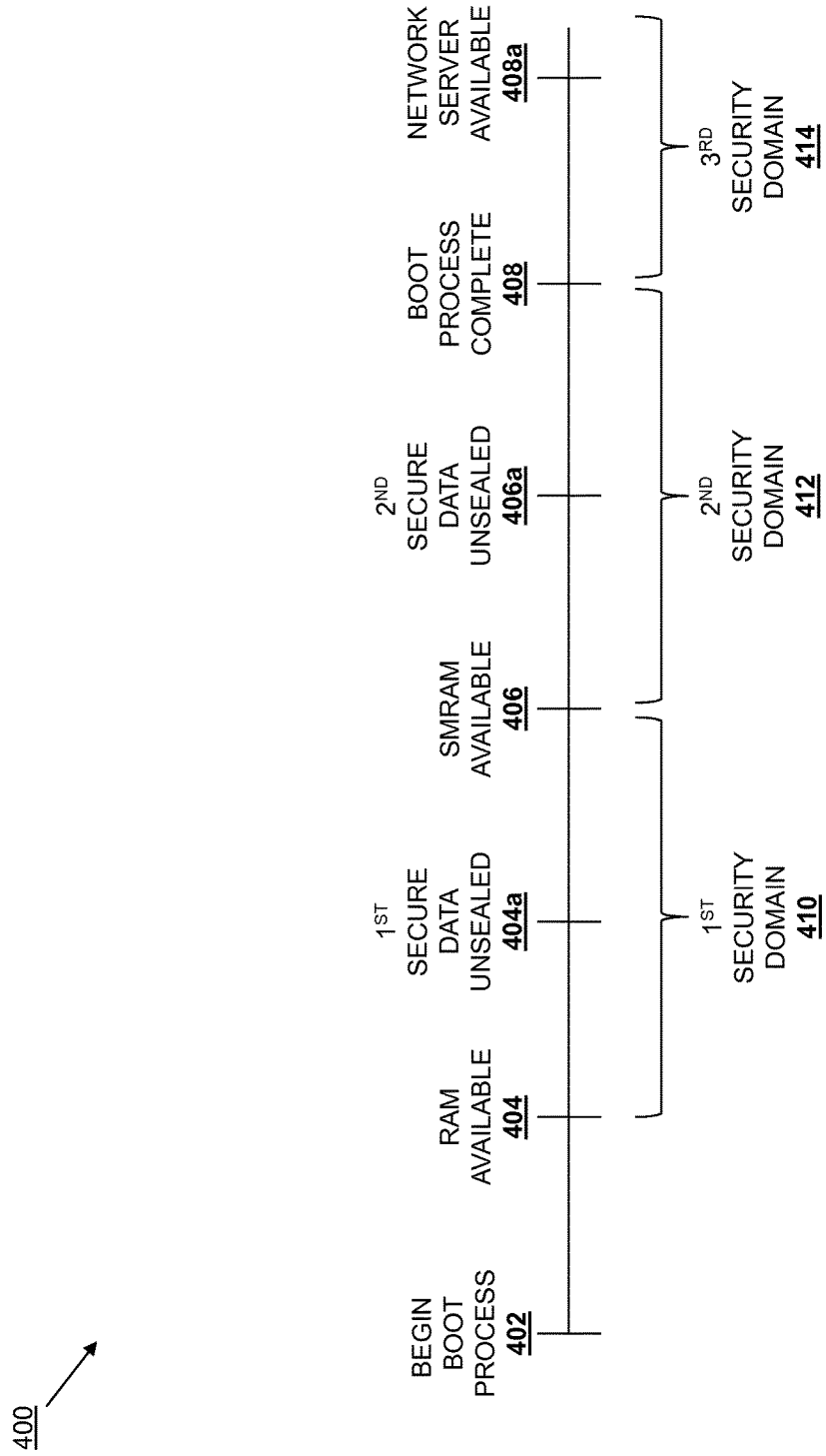
FIG. 4 is a timeline view illustrating an embodiment of a plurality of security domains provided during the method for BIOS secure data management of FIG. 3.

Referring now to FIGS. 3 and 4, an embodiment of a method 300 for providing BIOS secure data management is illustrated. FIG. 3 includes an embodiment of a flow chart for the method 300, while FIG. 4 includes a timeline that illustrates how a plurality of security domains may be provided during different and after IHS boot process. The method 300 begins at block 302 where secure data is sealed using the TPM. In some embodiments, block 302 is not performed each time the method 300 is performed (e.g., upon a reboot of the IHS), but will have been performed at some time prior to a current performance of the method 300 such that sealed secure data is provided in the TPM 210. In other words, prior to any current performance of the method 300, secure data has been sealed using the TPM 210, but subsequent to sealing secure data using the TPM 210, the method 300 may be performed any plurality of times without re-performing 302 to seal secure data using the TPM 210.

During the IHS boot process, the PCRs 210b, 210c, and 210d in the TPM 210 includes values that track measurements made during BIOS activities. Those measurements are created by performing a hash operation on a current register value and a new value that is provided using data generated during the IHS boot process, and the action of creating a measurement by hashing the current register value with the new value is called extending the value in the PCR. For example, following the beginning of an IHS boot process, a hash operation is performed a first value in a PCR and a first new value that is provided using data generated during the IHS boot process to extend the first value in the PCR such that a second value is provided. One of skill in the art in possession of the present disclosure will recognize that such data generated during the IHS boot process may include the entire boot block, any drivers that have loaded, the platform configuration structure, any boot loaders that were executed as part of the transition from BIOS to the operating system, and/or a variety of other IHS boot process data that may be hashed as discussed above to provide the first new value. That second value in the PCR may then be compared by the BIOS 212 to an expected value in order to determine whether any unauthorized code has executed in a first time period between the beginning of the boot process and the time that the data was generated to create the first new value (as the first new value that is provided using the data generated during the IHS boot process is a value generated only by authorized code that is expected to execute.) Subsequent to the first time period, a hash operation is performed on the second value in a PCR and a second new value that is provided using data generated during the IHS boot process to extend the second value in the PCR such that a third value is provided. That third value in the PCR may then be compared by the BIOS 212 to an expected value in order to determine whether any unauthorized code has executed in the first time period and/or in a second time period between the end of the first time period and the time that the data was generated to create the second new value. As such, each PCR 210b, 210c, and 210d may include values at different times during the IHS boot process that may be used to determine whether any unauthorized code has executed during the IHS boot process.

Furthermore, the TPM 210 may perform one or more operations that are not associated with the IHS boot process and/or otherwise provide data that is not associated with the IHS boot process but that may be used to extend one or more values in the PCRs 210b, 210c, and 210d. As discussed below, such TPM-operation-extended values may be used to extend cleared or reset values in the PCRs 210b, 210c, and 210d such that those cleared or reset values are not used to seal secure data, discussed below, or in order to change the values in the PCRs 210b, 210c, and 210d that were used to unseal secure data such that those values may no longer be used to unseal secure data (e.g., without requiring a system reboot).

At block 302, secure data may be sealed using the TPM 210 by requiring one or more values from the PCRs 210b, 210c, and 210d to access the secure data. In some embodiments of block 302, secure data may be provided to the TPM 210 and encrypted using one or more values from the PCRs 210b, 210c, and 210d that are expected at a particular time period associated with the IHS boot process based on the execution of authorized code during the IHS boot process, and that encrypted secure data may then only be decrypted at that particular time period associated with the IHS boot process by retrieving the one or more values from the PCRs 210b, 210c, and 210d and using them to attempt to decrypt the encrypted secure data. As such, decryption of the encrypted secure data will only be possible at that particular time period associated with the IHS boot process when only authorized code has executed during that IHS boot process. The sealing of secure data using the TPM 210 creates sealed secure data that may be stored in the TPM 210 (e.g., in the persistent memory of the TPM 210.)

In some embodiments, the secure data may include user passwords, user access keys, storage system passwords, ecryption/decryption keys, private and/or public keys of a public/private key pair, sensitive personal data (e.g., Social Security Numbers, etc.), and/or a variety of other secure data known in the art. For example, a decryption key may be used to encrypt data on the storage system 206, and at block 302 that decryption key may be sealed using the TPM 210 to create a sealed decryption key that is stored in the TPM. Furthermore, another decryption key or other secure data may be used to encrypt data utilized during the IHS boot process such as, for example, preferences and/or settings that determine the ordering of drivers in the boot process that should not be modified (or readable by a user). Furthermore, another decryption key or other secure data may be used to encrypt the BIOS, firmware, or operating system code used to accomplish a successful or complete boot to applications or operating systems installed on the system in other storage, whereby the lack of the decryption key would yield a system that is unable to function properly for the end user. As such, any plurality of secure data (e.g., any plurality of passwords, encryption keys, private keys, etc.) may be sealed using the TPM 210 such that different secure data may be unsealed by the TPM 210 at one or more times or time periods during the IHS boot process.

The method 300 then proceeds to block 304 where a boot process begins. In an embodiment, the IHS 100 and/or the BIOS secure data management system 200 may be powered on, reset, and/or otherwise caused to begin an IHS boot process. FIG. 4 illustrates an embodiment of a timeline 400 in which the IHS boot process begins at time 402. The method 300 then proceeds to block 306 where the TPM registers are cleared. In an embodiment, the TPM logic 210a operates to clear or reset each of the PCRs 210b, 210c, and 210d. The method 300 then proceeds to block 308 where secure data in the TPM is unsealed. As discussed above, the sealed secure data in the TPM 210 may be unsealed at particular times during the IHS boot process using one or more values in the PCRs 210b, 210c, and 210d. Thus, at different points in the IHS boot process such as processing system initialization, activation of the Power On Self-Test (POST), checking of inventoried hardware components, retrieval of the operating system, and/or a variety of other IHS boot process points known in the art, software executing on the IHS will generate data that is used to extend the values in the PCRs 210b, 210c, and 210d as discussed above. Such software generated data may include CPU specific microcode, operating system interface descriptions such as Differentiated System Description Tables (DSDT) and System Management BIOS tables, secure boot variables, current boot options and configurations, and/or a variety of other portions of the IHS boot process that may be measured prior to execution to extend values in the PCRs. The TPM logic 210a may then use one or more values in the PCRs 210b, 210c, and 210d at particular times or time periods during the IHS boot process to unseal the sealed secure data in the TPM. For example, the TPM logic 210a may use one or more values in the PCRs 210b, 210c, and 210d at a particular time or time period in the IHS boot process to attempt to decrypt encrypted secure data in the TPM 210, and that attempted decryption will only be successful at that particular time or time period in the IHS boot process when only authorized code has executed during that IHS boot process up to that particular time (i.e., such that the one or more values used in the attempted decryption are the expected values that were used to encrypt the secure data). The unsealing of sealed secured data by the TPM 210 creates unsealed secured data such as, using the examples provided above, an unsealed decryption key.

In an embodiment, the unsealing of the secure data by the TPM 210 at block 308 may include extending one or more values in the PCRs 210b, 210c, and 210d to create one or more extended values, and using those extended values to unseal the sealed secure data. For example, the TPM 210 may operate to extend values in the PCRs 210b, 210c, and 210d that were provided during the IHS boot process using data generated during the IHS boot process as discussed above. At a particular time or time period during the IHS boot process, a PCR will include a first value, and the TPM logic 210a may operate to perform one or more operations and/or otherwise generate data that is then used to extend the first value in the PCR to a second value (e.g., by performing the hashing operations discussed above). The TPM logic 210a may then use that second value (and/or other first and/or second values in the other PCRs) to unseal the sealed secure data substantially as discussed above. Such operations by the TPM 210 may ensure that a cleared or reset value in a PCR is not used to unseal sealed secure data.

Furthermore, following the unsealing of sealed secure data, the TPM logic 210a may operate to perform one or more operations and/or otherwise generate data that is used to extend any value in a PCR (e.g., extend a first value that was provided using data generated during the IHS boot process, extend a second value that provided using data that was generated by the TPM 210 and used to extend a first value that was provided using data generated during the IHS boot process as discussed above, etc.). Such operations by the TPM 210 may ensure that the values in the PCRs 210b, 210c, and 210d are extended following the unsealing of the sealed secure data at block 308 such that that sealed secure data cannot be unsealed without performing a reboot of the IHS (e.g., because the value(s) in the PCRs needed to unseal that sealed secure data have been extended and are no longer available).

The method 300 then proceeds to decision block 310 where it is determined whether an SM memory location (e.g., SMRAM in the illustrated embodiments) is available. The timeline 400 of FIG. 4 illustrates how, subsequent to the IHS boot process beginning at time 402 and during the IHS boot process, the RAM 208b becomes available at time 404 prior to the SMRAM 208a becoming available at time 406. The availability of the SMRAM 208a is determined primarily by the IHS boot process, and the SMRAM 208a becomes available at a particular time or time period during the IHS boot process. In an embodiment, the BIOS 212 may determine whether the SMRAM 208a is available when it has transitioned to SMM and a portion of the host memory system 208 has been allocated as the SMRAM 208a. If, at decision block 310, the BIOS 212 determines that the SMRAM is not available, the method 300 proceeds to block 312 where the secure data is stored in the RAM. In an embodiment of block 312, the BIOS 212 operates to retrieve the unsealed secure data from the TPM 210 and store that unsealed secure data in the RAM 208b of the host memory system 208.

FIG. 4 illustrates a first security domain 410 that is provided between the time 404 the RAM 208b becomes available and prior the time 406 the SMRAM 208a becomes available. As can be seen, in the first security domain 410, at a time 404a first secure data may be unsealed at block 308 and then stored in the RAM 208b at block 312, as discussed above. In some examples, the BIOS 212 may provide a first secure data management service (e.g., a first key management service) while the system is operating in the first security domain 410, and that first secure data management service may operate to retrieve the unsealed secure data from the TPM 210 and store that unsealed secure data in the RAM 208b. In an embodiment, the first security domain 410 (e.g., a pre-SMRAM security domain) may provide a slightly reduced level of security based on the storage of the unsealed secure data in the RAM 208b that is technically accessible by IHS components other than the BIOS, but which may provide a sufficient level of security for most secure data due to the BIOS 212 controlling the IHS boot process.

The method 300 then proceeds to block 314 where secure data is retrieved from the RAM. In an embodiment, the BIOS 212 may operate to retrieve the unsealed secure data that was stored in the RAM 208b at block 312, and use that unsealed secure data to perform a security function or provide that unsealed secure data to a subsystem to perform a security function. For example, with reference to FIG. 4, the BIOS 212 may provide the first secure data management service, discussed above, while the system is operating in the first security domain 410, and that first secure data management service may operate to retrieve the unsealed decryption key from the RAM 208b and use that unsealed decryption key to perform a decryption function on encrypted data used during the IHS boot process or provide that unsealed decryption key to a subsystem to perform a decryption function on encrypted data used during the IHS boot process. Encrypted data that may be decrypted during the IHS boot process may include the examples provided above, as well as user password hashes, storage device secure erase keys, operating system single sign-on keys and/or authentication profiles, and/or a variety of other IHS boot process data known in the art.

The method 300 then proceeds to decision block 316 where it is determined whether an SM memory location (e.g., SMRAM in the illustrated embodiment) is available in substantially the same manner as discussed above with reference to decision lock 310. If, at decision block 316, the BIOS 212 determines that the SMRAM 208a is not available, the method 300 proceeds to decision block 318 where it is determined whether additional secure data is unsealed in the TPM. As discussed above with reference to block 308, the TPM 210 may unseal sealed secure data at different times during the IHS boot process using one or more values in the PCRs 210b, 210c, and 210d, and following the unsealing of the sealed secure data discussed above with reference to block 308, additional sealed secure data may be unsealed by the TPM 210 in substantially the same manner. If, at decision block 318, additional secure data is unsealed in the TPM 210, the method 300 proceeds to block 312 where that unsealed secure data is then stored in the RAM 208b substantially as described above, to block 314 where that unsealed secure data is retrieved from the RAM 208b and used to perform a security function substantially as described above, and to decision block 316 where it is determined whether the SMRAM is available substantially as described above. If, at decision block 318, additional secure data is not unsealed in the TPM 210, the method 300 proceeds to decision block 316 where it is determined whether the SMRAM 208a is available substantially as described above. Thus, the operations of the TPM 210 in unsealing sealed secure data as described above with reference to block 308 may continue throughout the IHS boot process, and blocks 312, 314, 316 and 318 of the method 300 will operate to store discrete unsealed secure data (e.g., different decryption keys) in the RAM 208b and use any of that discrete unsealed secure data (when necessary) to perform security functions as long as the SM memory location (e.g., the SMRAM 208a) is not available.

Following a determination at decision blocks 310 or 316 that the SM memory location (e.g., the SMRAM 208a) is available (e.g., upon the SMRAM 208a becoming available during the IHS boot process), the method 300 proceeds to block 320 where secure data is stored in the SMRAM 208a. In embodiments in which secure data is unsealed in the TPM 210 at block 308 when the SMRAM 208a is available (as determined at block 310), the BIOS 212 may operate at block 320 to retrieve the unsealed secure data from the TPM 210 and store that unsealed secure data in the SMRAM 208a.

FIG. 4 illustrates a second security domain 412 that is provided between the time 406 the SMRAM 208a becomes available and prior to the time 408 the IHS boot process is complete. As can be seen, in the second security domain 412, at a time 406a second secure data may be unsealed at block 308 and then stored in the SMRAM 208a at block 320, as discussed above. In some examples, the BIOS 212 may provide a second secure data management service (e.g., a second key management service) while the system is operating in the second security domain 412, and that second secure data management service may operate to store unsealed secure data in the SMRAM 208a and retrieve the unsealed secure data from the SMRAM. In an embodiment, the second security domain 412 (e.g., a post-SMRAM security domain) may provide an enhanced level of security (e.g., relative to the first security domain 410) based on the storage of the unsealed secure data in the SMRAM 208a that is only accessible by the BIOS 212.

In embodiments in which secure data is unsealed in the TPM 210 at block 308 and stored in the RAM 208b while the SMRAM 208a is not available (as determined at blocks 310 and/or 316), the BIOS 212 may operate at block 320 to retrieve the unsealed secure data from the RAM 208b, store that unsealed secure data in the SMRAM 208a, and remove that unsealed data from the RAM 208b. For example, upon the SMRAM 208a becoming available and the system entering the second security domain 412, a first secure data management service (e.g., a first key management service) provided by the BIOS 212 in the first security domain 410 may operate to retrieve the unsealed secure data from the RAM 208b and provide that unsealed secure data to a second secure data management service (e.g., a second key management service) provided by the BIOS 212 in the second security domain 412, and the second secure data management service may then store that unsealed security data in the SMRAM 208a.

The method 300 then proceeds to block 322 where unsealed secure data is retrieved from the SM memory location (e.g., the SMRAM 208a). In an embodiment, the BIOS 212 may operate to retrieve the unsealed secure data that was stored in the SMRAM 208a at block 322, and use that unsealed secure data to perform a security function or provide that unsealed secure data to a subsystem to perform a security function. In embodiments where the SMRAM 208a includes both unsealed secure data associated with the first security domain 410 (e.g., sealed secure data that was unsealed prior to the SMRAM 208a becoming available) and unsealed secure data associated with the second security domain 412 (e.g., sealed secure data that was unsealed subsequent to the SMRAM 208a becoming available), the BIOS 212 may operate to retrieve unsealed secure data for use in performing security functions associated with either of the first security domain 410 or the second security domain 412. For example, with reference to FIG. 4, the BIOS 212 may provide the second key management service, discussed above, while the system is operating in the second security domain 412, and that second key management service may operate to retrieve a first unsealed decryption key from the SMRAM 208a and use that first unsealed decryption key to perform a decryption function on encrypted data associated with the first security domain or provide that first unsealed decryption key to a subsystem to perform a decryption function on encrypted data associated with the first security domain (e.g., an IHS boot process encryption operation, discussed above), or to retrieve a second unsealed decryption key from the SMRAM 208a and use that second unsealed decryption key to perform a decryption function on encrypted data associated with the second security domain (e.g., decrypt encrypted data on the storage system 206) or provide that second unsealed decryption key to a subsystem to perform a decryption function on encrypted data associated with the second security domain.

The method 300 then proceeds to decision block 324 where it is determined whether additional secure data is unsealed in the TPM. As discussed above with reference to block 308, the TPM 210 may unseal sealed secure data at particular times or time periods during the IHS boot process using one or more values in the PCRs 210b, 210c, and 210d, and additional sealed secure data may be unsealed by the TPM 210 subsequent to determining that the SMRAM 208a is available at blocks 310 or 316 in substantially the same manner as discussed above. If, at decision block 324, additional secure data is unsealed in the TPM 210, the method 300 proceeds to block 320 where that unsealed secure data is then stored in the SMRAM 208a substantially as described above, and to block 322 where that unsealed secure data is retrieved from the SMRAM 208a and used to perform a security function substantially as described above. If, at decision block 324, additional secure data is not unsealed in the TPM 210, the method 300 proceeds to decision block 326 where it is determined whether the IHS boot process is complete. If, at decision block 326, it is determined that the IHS boot process is not complete, the method 300 returns to block 322. Thus, the operations of the TPM 210 in unsealing sealed secure data as described above with reference to block 308 may continue throughout the IHS boot process, and blocks 320, 322, 324 and 326 of the method 300 will operate to store discrete unsealed secure data (e.g., different decryption keys) in the SMRAM 208a and use any of that discrete unsealed secure data (when necessary) to perform security functions If, at decision block 326, it is determined that the IHS boot process is complete, the method 300 may proceed to optional block 328 where secure data is stored in a network server. In some embodiments of the method 300, upon completion of the IHS boot process, the BIOS 212 may operate to retrieve the unsealed secure data from the SMRAM 208a and provide that unsealed secure data over a network to a network server (e.g., a key server) that has become available subsequent to the completion of the IHS boot process. While block 328 of the method 300 is discussed as being performed upon determining that an IHS boot process is complete, one of skill in the art will recognize that the BIOS 212 may operate to retrieve the unsealed secure data from the SMRAM 208a and provide that unsealed secure data over a network to a network server prior to the completion of the IHS boot process as along as the IHS boot process has proceeded to the point where networking resources (e.g., chipsets, drivers, etc.) are available. As such, the BIOS 212 may operate to store secure data in the network server upon being able to access the network server such that a new security domain, discussed below, is provided.

FIG. 4 illustrates a third security domain 414 that is provided subsequent to the time 408 the IHS boot process is complete. As can be seen, in the third security domain 414, at a time 408a a network server may become available. In some examples, the BIOS 212 may provide a third secure data management service (e.g., a third key management service) while the system is operating in the third security domain 414, and that third secure data management service may operate to store unsealed secure data in the network server and retrieve the unsealed secure data from the network. For example, upon the system entering the third security domain 414 and the network server becoming available, a second secure data management service (e.g., a second key management service) provided by the BIOS 212 in the second security domain 412 may operate to retrieve the unsealed secure data from the SMRAM 208a and provide that unsealed secure data to a third secure data management service (e.g., a third key management service) provided by the BIOS 212 in the third security domain 414, and the third secure data management service may then provide that unsealed security data over the network for storage in the network server. However, in some embodiments, optional block 328 may be skipped and the unsealed secure data may remain stored in the SMRAM 208a.

The method 300 then proceeds to block 330 where the secure data is retrieved. In an embodiment, the BIOS 212 may operate to retrieve the unsealed secure data that was stored in the SMRAM 208a at block 320, and use that unsealed secure data to perform a security function or provide that unsealed secure data to a subsystem to perform a security function. In embodiments where the SMRAM 208a includes both unsealed secure data associated with the first security domain 410 (e.g., sealed secure data that was unsealed prior to the SMRAM 208a becoming available), unsealed secure data associated with the second security domain 412 (e.g., sealed secure data that was unsealed subsequent to the SMRAM 208a becoming available), and secure data that was accessed during the third security domain 414, the BIOS 212 may operate to retrieve unsealed secure data for use in performing security functions associated with any of the first security domain 410, the second security domain 412, and the third security domain 414. For example, with reference to FIG. 4, the BIOS 212 may provide the third key management service, discussed above, while the system is operating in the third security domain 414, and that third key management service may operate to retrieve a first unsealed decryption key from the SMRAM 208a and use that first unsealed decryption key to perform a decryption function on encrypted data associated with the first security domain or provide that first unsealed decryption key to a subsystem to perform a decryption function on encrypted data associated with the first security domain, or to retrieve a second unsealed decryption key from the SMRAM 208a and use that second unsealed decryption key to perform a decryption function on encrypted data associated with the second security domain 412 (e.g., decrypt encrypted data on the storage system 206) or provide that second unsealed decryption key to a subsystem to perform a decryption function on encrypted data associated with the second security domain 412, or to retrieve a third decryption key from the SMRAM 208a and use that third decryption key to perform a decryption function on encrypted data associated with the third security domain 414 or provide that third unsealed decryption key to a subsystem to perform a decryption function on encrypted data associated with the third security domain 414.

In an embodiment, the BIOS 212 may operate to retrieve the unsealed secure data that was stored in the network server at optional block 328, and use that unsealed secure data to perform a security function or provide that unsealed secure data to a subsystem to perform a security function. In embodiments where the network server includes both unsealed secure data associated with the first security domain 410 (e.g., sealed secure data that was unsealed prior to the SMRAM 208a becoming available), unsealed secure data associated with the second security domain 412 (e.g., sealed secure data that was unsealed subsequent to the SMRAM 208a becoming available), and secure data that was accessed during the third security domain 414, the BIOS 212 may operate to retrieve unsealed secure data for use in performing security functions associated with any of the first security domain 410, the second security domain 412, and the third security domain. For example, with reference to FIG. 4, the BIOS 212 may provide the third key management service, discussed above, while the system is operating in the third security domain 414, and that third key management service may operate to retrieve a first unsealed decryption key from the network server and use that first unsealed decryption key to perform a decryption function on encrypted data associated with the first security domain 410 or provide that first unsealed decryption key to a subsystem to perform a decryption function on encrypted data associated with the first security domain 410, or to retrieve a second unsealed decryption key from the network server and use that second unsealed decryption key to perform a decryption function on encrypted data associated with the second security domain 412 (e.g., decrypt encrypted data on the storage system 206) or provide that second unsealed decryption key to a subsystem to perform a decryption function on encrypted data associated with the second security domain 412, or to retrieve a third decryption key from the network server and use that third decryption key to perform a decryption function on encrypted data associated with the third security domain 414 or provide that third unsealed decryption key to a subsystem to perform a decryption function on encrypted data associated with the third security domain 414.

Thus, systems and methods have been described that leverage a TPM and the SMRAM that is only accessible to the BIOS to provide for the storage and retrieval of secure data such that that secure data is available to the BIOS across different IHS boots. Secure data such as, for example, keys, may be sealed in a TPM, and then unsealed in the TPM during the IHS boot process and stored in the SMRAM such that the decryption keys are only available to the BIOS. The TPM may operate on its registers subsequent to using first register values to unseal the decryption keys in order to extend those register values to second register values such that the first register values are unavailable during the remainder of the IHS boot process or following IHS boot process completion for unsealing the decryption keys. The systems and methods provide for access to different decryption keys during different phases of the IHS boot process while maximizing the security of each of those decryption keys with all the resources that are available during the phase of the IHS boot process in which that decryption key becomes available.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS) secure data management system, comprising:
   a Basic Input/Output System (BIOS) that is configured to perform a boot process;
   a memory system that is configured to provide a System Management (SM) memory location that is only accessible by the BIOS such that only the BIOS stores data in the SM memory location and retrieves data from the SM memory location; and
   a trusted platform module (TPM) that includes a register and that is configured to:
      store sealed first secure data, wherein first secure data is encrypted using a value from the register that is expected based on execution of authorized code at a particular time period during the boot process to provide the sealed first secure data;

use a first value in the register that is generated by performing a hash operation on a previous value in the register and at least one first measurement made during the boot process to unseal the sealed first secure data to provide unsealed first secure data; and provide the unsealed first secure data to the BIOS for storage in the SM memory location;

wherein the BIOS is configured to:
store the unsealed first secure data in the SM memory location;
retrieve, during the boot process for use in performing a security function that requires the unsealed first secure data, the unsealed first secure data from the SM memory location; and
use the unsealed first secure data to perform the security function.

2. The BIOS secure data management system of claim 1, wherein the BIOS is configured to:
determine that the SM memory location is available; and
store, in response to determining that the SM memory location is available, the unsealed first secure data in the SM memory location.

3. The BIOS secure data management system of claim 2, wherein:
the memory system is configured to provide a non-SM memory location;
the trusted platform module (TPM) is configured to:
store sealed second secure data;
use a one second value in the register that is generated based on at least one second measurement made during the boot process in order to unseal the sealed second secure data to provide unsealed second secure data; and
provide the unsealed second secure data to the BIOS; and
the BIOS is configured to:
determine that the SM memory location is not available;
store, in response to determining that the SM memory location is not available, the unsealed second secure data in the non-SM memory location; and
retrieve the unsealed second secure data from the non-SM memory location and use the unsealed second secure data to perform a security function.

4. The BIOS secure data management system of claim 3, wherein the BIOS provides a first secure data management service prior to the SM memory location being available and a second secure data management service subsequent to the SM memory location being available, and wherein, in response to determining that the SM memory location is available, the first secure data management service is configured to provide the unsealed second secure data to the second secure data management service, and wherein the second secure data management service is configured to store the unsealed second secure data in the SM memory location.

5. The BIOS secure data management system of claim 4, wherein the second secure data management service is configured to:
retrieve the unsealed second secure data from the SM memory location; and
use the unsealed second secure data to perform a security function.

6. The BIOS secure data management system of claim 1, wherein the TPM is configured to unseal the sealed first secure data using the first value from the register by:

extending the first value in the register by performing a hash operation on the first value in the register and at least one second measurement made during the boot process to provide a second value in the register; and
using the second value to unseal the sealed first secure data.

7. The BIOS secure data management system of claim 1, wherein the TPM is configured to extend the first value in the register that was used to unseal the sealed first secure data to provide a second value in the register that is unsuitable for unsealing the sealed first secure data.

8. An information handling system (IHS), comprising:
a Basic Input/Output System (BIOS) that is configured to perform a system boot process;
a processing system;
a memory system that is coupled to the processing system and that is configured to provide a System Management Random Access Memory (SMRAM) that is only accessible by the BIOS such that only the BIOS stores data in the SMRAM and retrieves data from the SMRAM;
a storage system that includes an encrypted item; and
a trusted platform module (TPM) that includes a register and that is configured to:
store a sealed first decryption key, wherein a first decryption key is encrypted using a value from the register that is expected based on execution of authorized code at a particular time period during the system boot process to provide the sealed first decryption key;
use a first value in the register that is generated by performing a hash operation on a previous value in the register and at least one first measurement made during the system boot process to unseal the sealed first decryption key to provide an unsealed first decryption key; and
provide the unsealed first decryption key to the BIOS for storage in the SMRAM; and
wherein the BIOS is configured to:
store the unsealed first decryption key in the SMRAM;
retrieve, during the boot process for use in decrypting the encrypted item, the unsealed first decryption key from the SMRAM; and
use the unsealed first decryption key to decrypt the encrypted item in the storage system.

9. The IHS of claim 8, wherein the BIOS is configured to:
determine that the SMRAM is available; and
store, in response to determining that the SMRAM is available, the unsealed first decryption key in the SMRAM.

10. The IHS of claim 9, wherein:
the memory system is configured to provide a non-SMRAM;
the trusted platform module (TPM) is configured to:
store a sealed second decryption key;
use a second value in the register that is generated based on at least one second measurement made during the system boot process to unseal the sealed second decryption key to provide an unsealed second decryption key; and
provide the unsealed second decryption key to the BIOS for storage in the non-SMRAM; and
the BIOS is configured to:
determine that the SMRAM is not available;
store, in response to determining that the SMRAM is not available, the unsealed second decryption key in the non-SMRAM; and retrieve the unsealed second decryption key from the non-SMRAM and use the unsealed second decryption key to perform a security function.

11. The IHS of claim 10, wherein the BIOS provides a first key management service prior to the SMRAM being available and a second key management service subsequent to the SMRAM being available, and wherein, in response to determining that the SMRAM is available, the first key management service is configured to provide the unsealed second decryption key to the second key management service, and wherein the second key management service is configured to store the unsealed second decryption key in the SMRAM.

12. The IHS of claim 11, wherein the second key management service is configured to:
retrieve the unsealed second decryption key from the SMRAM; and
use the unsealed second decryption key to perform a security function.

13. The IHS of claim 8, wherein the TPM is configured to unseal the sealed first decryption key using the first value from the register by:
extending the first value in the register by performing a hash operation on a previous value in the register and at least one second measurement made during the system boot process to provide second value in the register; and
using the at least one second value to unseal the sealed first decryption key.

14. The IHS of claim 8, wherein the TPM is configured to extend the first value in the register that was used to unseal the sealed first decryption key to provide a second value in the register that is unsuitable for unsealing the sealed first decryption key.

15. A method for providing Basic Input/Output System (BIOS) secure data management, comprising:
encrypting, by a trusted platform module (TPM) that includes a register, first secure data using a value from the register that is expected based on execution of authorized code at a particular time period during a boot process to provide sealed first secure data;
performing, by a Basic Input/Output System (BIOS), a boot process;
unsealing, by the TPM, the sealed first secure data using a first value in the register that is generated by performing a hash operation on a previous value in the register and at least one first measurement made during the boot process, wherein the unsealing of the sealed first secure data provides unsealed first secure data;
determining, by the BIOS, that a System Management (SM) memory location in a memory system that is only accessible to the BIOS is available such that only the BIOS may store data in the SM memory location and retrieve data from the SM memory location;
storing, by the BIOS in response to determining that the SM memory location is available, the unsealed first secure data in the SM memory location;
retrieving, by the BIOS and during the boot process for use in performing a security function that requires the unsealed first secure data, the unsealed first secure data from the SM memory location; and
using, by the BIOS, the unsealed first secure data to perform the security function.

16. The method of claim 15, further comprising:
sealing, by the trusted platform module (TPM), second secure data to provide sealed second secure data;
unsealing, by the TPM, the sealed second secure data using a second value in the register that is generated based on at least one second measurement made during the boot process, wherein the unsealing of the sealed second secure data provides unsealed second secure data;
determining, by the BIOS, that the SM memory location is not available and, in response, storing the unsealed second secure data in a non-SM memory location in the memory system; and
retrieving, by the BIOS, the unsealed second secure data from the non-SM memory location and using the unsealed second secure data to perform a security function.

17. The method of claim 16, wherein the BIOS provides a first secure data management service prior to the SM memory location being available and a second secure data management service subsequent to the SM memory location being available, and wherein the method further comprises:
providing, by the first secure data management service in response to determining that the SM memory location is available, the unsealed second secure data to the first secure data management service; and
storing, by the second secure data management service, the unsealed second secure data in the SM memory location.

18. The method of claim 17, further comprising:
retrieving, by the second secure data management service, the unsealed second secure data from the SM memory location and using the unsealed second secure data to perform a security function.

19. The method of claim 15, wherein unsealing the sealed first secure data using the first value from the register that is generated by performing a hash operation on a previous value in the register and the at least one first measurement made during the boot process further comprises:
extending, by the TPM, the first value in the register by performing a hash operation on the first value in the register and at least one second measurement made during the boot process to provide a second value in the register; and
using, by the TPM, the second value to unseal the sealed first secure data.

20. The method of claim 15, further comprising:
extending, by the TPM, the first value in the register that was used to unseal the sealed first secure data to provide a second value in the register that is unsuitable for unsealing the sealed first secure data.

* * * * *